(12) United States Patent
Chen et al.

(10) Patent No.: US 7,006,287 B2
(45) Date of Patent: Feb. 28, 2006

(54) OPTICAL POLARIZATION BEAM COMBINER

(75) Inventors: Cheng-Fa Chen, Hsinchu (TW); Ming-Hung Chen, Hsinchu (TW); Wei-Shyang Wang, Hsinchu (TW); Li-Chuan Mau, Hsinchu (TW)

(73) Assignee: Industrial Technology Research Institute, (TW)

( * ) Notice: Subject to any disclaimer, the term of this patent is extended or adjusted under 35 U.S.C. 154(b) by 0 days.

(21) Appl. No.: 10/861,512

(22) Filed: Jun. 7, 2004

(65) Prior Publication Data

US 2005/0174640 A1    Aug. 11, 2005

(30) Foreign Application Priority Data

Feb. 6, 2004 (TW) .................. 93102859 A

(51) Int. Cl.
*G02B 5/30* (2006.01)

(52) U.S. Cl. .................. 359/495; 359/496; 359/497
(58) Field of Classification Search ........... 359/495, 359/496, 497; 385/11, 33, 34
See application file for complete search history.

(56) References Cited

U.S. PATENT DOCUMENTS

| | | | | |
|---|---|---|---|---|
| 5,734,763 A | * | 3/1998 | Chang | 385/11 |
| 5,933,269 A | * | 8/1999 | Robinson | 359/280 |
| 6,014,256 A | * | 1/2000 | Cheng | 359/495 |
| 6,061,167 A | * | 5/2000 | Song | 359/256 |
| 6,212,313 B1 | * | 4/2001 | Li | 385/24 |
| 6,246,807 B1 | * | 6/2001 | Lu et al. | 385/11 |
| 6,282,025 B1 | * | 8/2001 | Huang et al. | 359/495 |
| 6,331,913 B1 | | 12/2001 | Huang et al. | |
| 6,438,278 B1 | * | 8/2002 | Liu et al. | 385/11 |
| 6,476,967 B1 | * | 11/2002 | Hu et al. | 359/484 |
| 6,493,139 B1 | * | 12/2002 | Liu et al. | 359/484 |
| 6,643,064 B1 | | 11/2003 | Huang et al. | |
| 6,661,577 B1 | * | 12/2003 | Wu et al. | 359/619 |
| 6,757,101 B1 | * | 6/2004 | Jin et al. | 359/484 |
| 6,791,751 B1 | * | 9/2004 | Chen et al. | 359/497 |
| 2004/0080827 A1 | | 4/2004 | Chen et al. | |

* cited by examiner

*Primary Examiner*—Ricky D. Shafer
(74) *Attorney, Agent, or Firm*—Harness, Dickey & Pierce PLC

(57) ABSTRACT

An optical polarization beam combiner includes a polarization beam displacer or a birefringent crystal that is provided with a deflecting edge having two slant deflecting faces. The deflecting edge economically replaces for the wedged crystals of the prior art to modify the transmission directions of the incidental and/or emerging light beams.

4 Claims, 13 Drawing Sheets

OPTICAL POLARIZATION BEAM COMBINER

BACKGROUND OF THE INVENTION

1. Field of Invention

The present invention generally relates to a polarization beam combiner, suitable for high-density wavelength multi-functional fiber optic systems. More particularly, the invention relates to the field of optical polarization beam combiners that associate birefringent crystals and wedged crystals.

2. Related Art

As the information technology rapidly progresses, higher performance of optical communication systems is required. For optical communication within short distances, laser techniques may be implemented with satisfactory results. However, the laser techniques do not provide sufficient power for optical communication performed at distances up to 40 kilometers. In this case, the communication system usually must be equipped with erbium-doped fiber amplifiers (EDFA) and Raman amplifiers, which increases the equipment and maintenance costs.

To overcome these problems, an economical solution known in the art combines the light powers of three-ports passive elements that are associated with a laser source to form a high laser-power device capable of providing relatively higher power, similar to the role of EDFA and Raman amplifiers. This equipment further can include the assembly of light-isolating devices to prevent reverse optical noises in the fiber optical communication system, thereby improving the system quality.

U.S. Pat. No. 6,331,913 describes such a system provided with the functions of polarization beam combiner and splitter. However, the disclosed structure has a complex and bulky structure that requires a high manufacturing cost. Moreover, the system disclosed in the U.S. patent does not include reverse isolating characteristics and light isolating devices have to be additionally mounted.

As shown in FIG. 12A–12B, the present application have proposed a technical solution in the U.S. Patent Publication No. 2004/0080827. However, a disadvantage of the assembly disclosed in the U.S. Patent Publication is that the base of the wedged crystal 9 has to be mounted to the birefringent crystal to couple the emerging light beam to a same optical fiber, which increases the manufacture cost. As illustrated in FIG. 12C–12D, the implementation disclosed in U.S. Patent No. 6,643,064 for alternately dividing an optical wavelength encounters the same problems as illustrated in FIG. 12A–12B.

SUMMARY OF THE INVENTION

It is therefore an objective of the invention to provide a polarization beam combiner that can overcome the prior problems, and does not need the design of a wedged crystal to reduce the manufacture cost.

To achieve the above and other objectives, the polarization beam combiner includes a birefringent crystal that has a deflecting edge with two deflecting faces in lieu of the conventional wedged crystal to modify the angle of the incidental and/or emerging light.

According to another embodiment, the birefringent crystal of an optical wavelength alternating divider also includes a deflecting edge with two deflecting faces in lieu of wedged crystals to reduce the manufacture cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein be low illustration only, and thus doesn't limit the present invention, wherein.

DETAILED DESCRIPTION OF THE INVENTION

Figure 1:
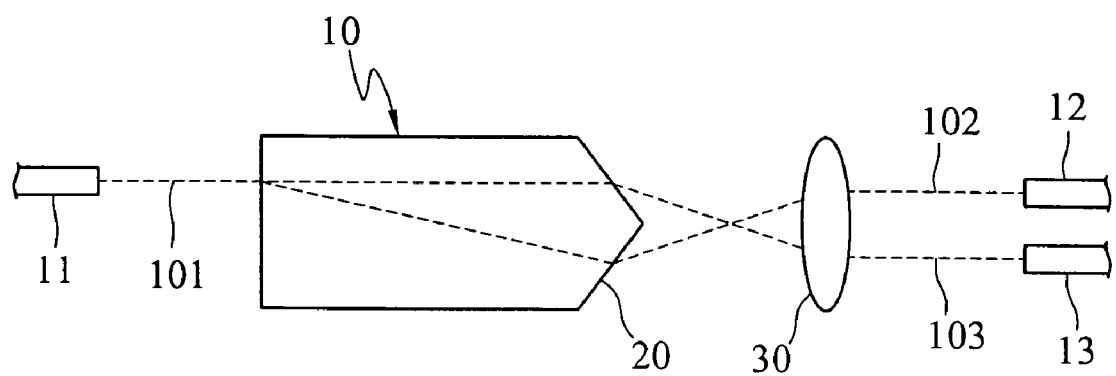
FIG. 1 is a schematic view of a polarization beam combiner according to a first embodiment of the invention.

FIG. 1 is a schematic view of an optical polarization beam combiner according to a first embodiment of the invention. The optical polarization beam combiner includes a birefringent crystal 10 and a lens 30 having a non-spherical face, a graded-index(GRIN) lens, or an aspherical lens. A light port 11 is placed at a side of the birefringent crystal 10, and a deflecting edge 20 having two slant deflecting faces is located at another side of the birefringent crystal 10. Light traveling through upper and lower parts of the birefringent crystal 10 emerges from the deflecting edge 20 with different angles of deviation. The lens 30 is placed between the deflecting edge 20 and the second and third light ports 12, 13. As a result, a light beam 101 emitted from the first light port 11 and entering the birefringent crystal 10 will subsequently divide into second and third light beams 102, 103 polarized orthogonal to each other. The light beams 102, 103 then will emerge from the deflecting edge 20 deviated at different angles and subsequently enter the lens 30 to be deflected. The light beams 102, 103 are thereby coupled to input into the second and third light port 12, 13. In a reverse manipulation, orthogonally polarized second, third light beams 102, 103 from the second and third light ports 12, 13 can travel through the combiner and be subsequently coupled to input into the first light port 11.

Figure 2A:
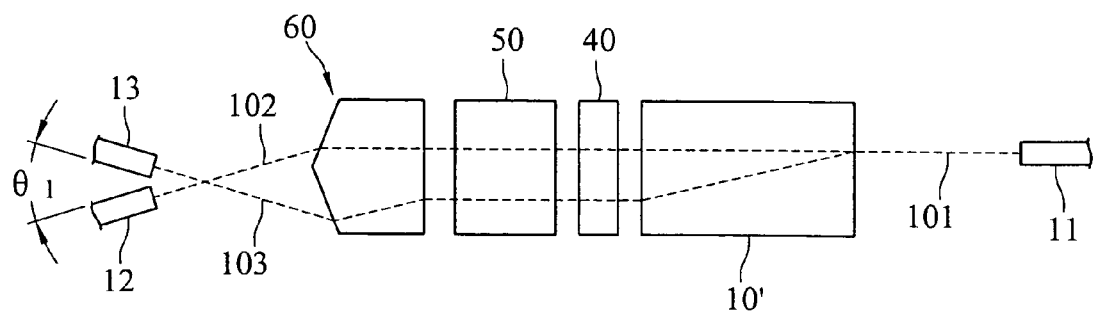
FIG. 2A is a schematic view of a polarization beam combiner according to a second embodiment of the invention.
Figure 2B:
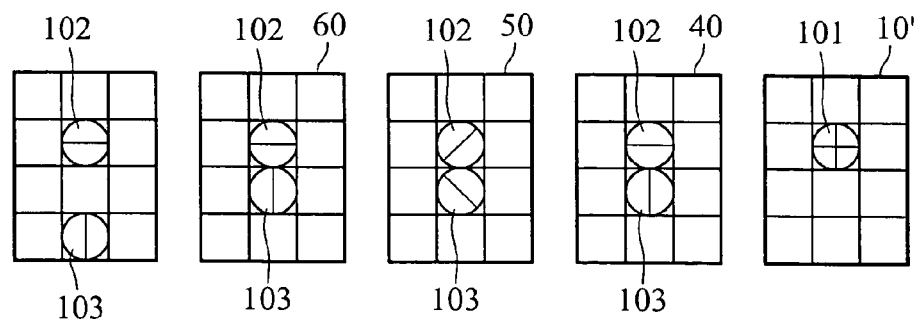
FIG. 2B is a schematic view illustrating the light polarization states of FIG. 2A.

FIG. 2A is a schematic view of an optical unidirectional polarization beam combiner according to a second embodiment of the invention, and FIG. 2B depicts the light polarization states in a section of each optical element of FIG. 2A. Second, third light beams 102, 103 from light ports 12, 13 are orthogonally polarized and impinge on two faces of the deflecting edge 20 of the birefringent crystal 60. Each polarized light is deflected and subsequently impinges on the Faraday rotator 50 where it is angled. After traveling through the half-wave plate 40, each polarized light is reversely rotated the same angle so as have the same polarization component of the original light beams 102, 103. The rotation angle is preferably 45°, the angle between the axis of the half-wave plate 40 and the polarization axis of the incidental light is 22.5°, and the magnetic field direction of the Faraday rotator 50 is 22.5°.

In an example, the second light beam 102 can be an odd ray with respect to the birefringent crystal 60, and transmits there through the initial light path. The third light beam 103 can be an even ray with respect to the birefringent crystal 60, and transmits there through with a phase shift. The light beams 102, 103 traveling through the Faraday rotator 50 and half-wave plate 40 rotate 45° respectively anticlockwise and clockwise to return to the original polarization state. Lastly, the light signals while passing through the birefringent crystal 10' are combined into the first light beam 101 to input into the first light port 11.

Figure 3A:
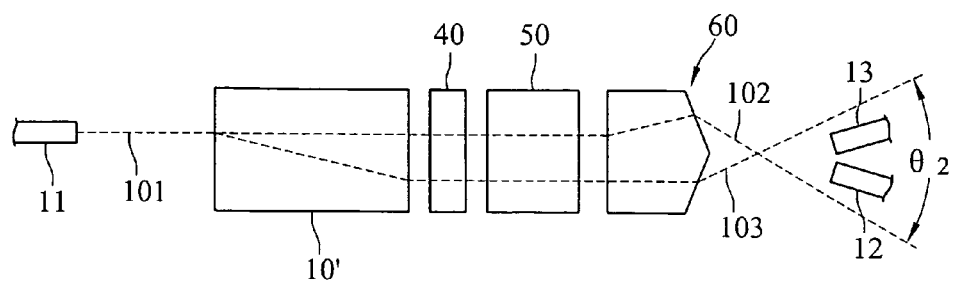
FIG. 3A is a schematic view of a polarization beam combiner according to the second embodiment of the invention, illustrated in a light splitting state.
Figure 3B:
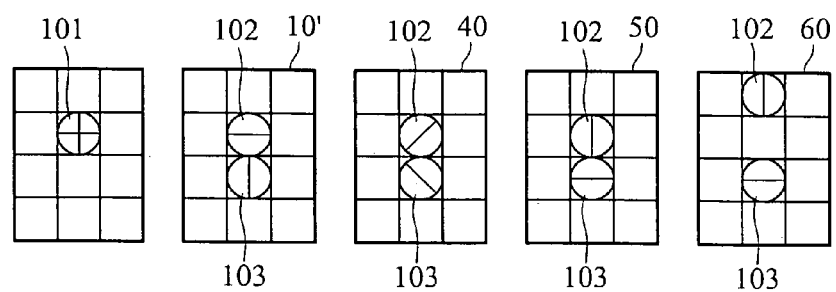
FIG. 3B is a schematic view illustrating the light polarization states of FIG. 3A.

FIGS. 3A and 3B illustrate a reverse operation of the foregoing embodiment according to the invention. A first light beam 101 output from the first light port 11 travels through the birefringent crystal 10' and is divided into second, third light beams 102 (for example odd ray), 103 (for example even ray). Due to the reciprocal property, the polarizations of the two beams are rotated counterclockwise by 45 degrees, which is the same states as the reversed incident beams. The Faraday rotator 50 has a non-reciprocal property so that light traveling there through has its polarization direction rotated 45°, which results in a phase retardation of 90° relative to the incidental light. As a result, the second, third light beams 102, 103 incidental to the birefringent crystal 60 are respectively odd and even rays. The second, third light beams 102, 103 traveling through the birefringent crystal 60 have their respective light paths deflected. The deflected light beams 102, 103 form an angle $\theta_2$ which differs from the angle $\theta_1$ between the light beams 102, 103 output from the light ports 12, 13, as shown in FIG. 2A. As a result, the deflected light beams 102, 103 cannot be coupled and input into the light ports 12, 13. Lights of reverse directions can be thereby blocked.

Figure 4:
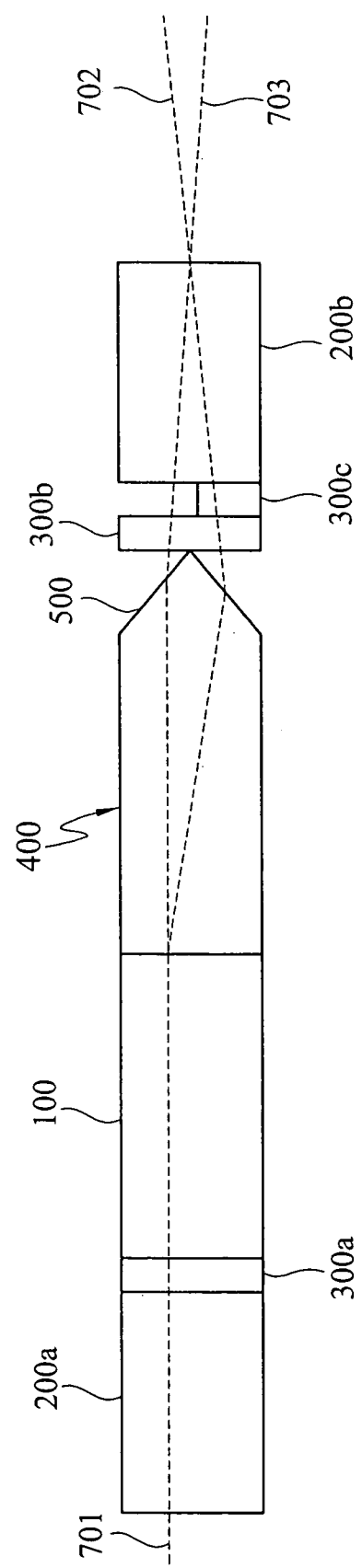
FIG. 4 is a schematic view of a polarization beam combiner according to a third embodiment of the invention.

FIG. 4 is a schematic view of a third embodiment of the invention implemented into an optical wavelength alternating divider/combiner. The third embodiment includes a first polarization beam splitter/combiner 200a, a first polarization rotating crystal 300a, an optical wavelength alternating divider device 100, a polarization beam displacer 400, a deflecting edge 500, second and third polarization rotating crystals 300b, 300c and a second polarization beam splitter/combiner 200b. The incidental light 701 output from a single-optical-fiber collimator includes light signals of a plurality of wavelengths ($\lambda_1$, $\lambda_2$, $\lambda_3$, $\lambda_4$, etc). After traveling through the polarization beam combiner, the light is divided into an odd ray 702 and an even ray 703 that are combined to input into two light ports of a dual-optical-fiber collimator. The polarization beam displacer 400 and the polarization beam splitter/combiner 200a, 200b can be birefringent crystals, the polarization rotating crystals 300a, 300b, 300c can be Faraday rotators or half-wave plates. The deflecting edge 500 is provided at a side of the polarization beam displacer 400 and includes two deflecting faces through which light transmitting through upper, lower parts of the polarization beam displacer 400 are respectively deflected at different angles.

Figure 5:
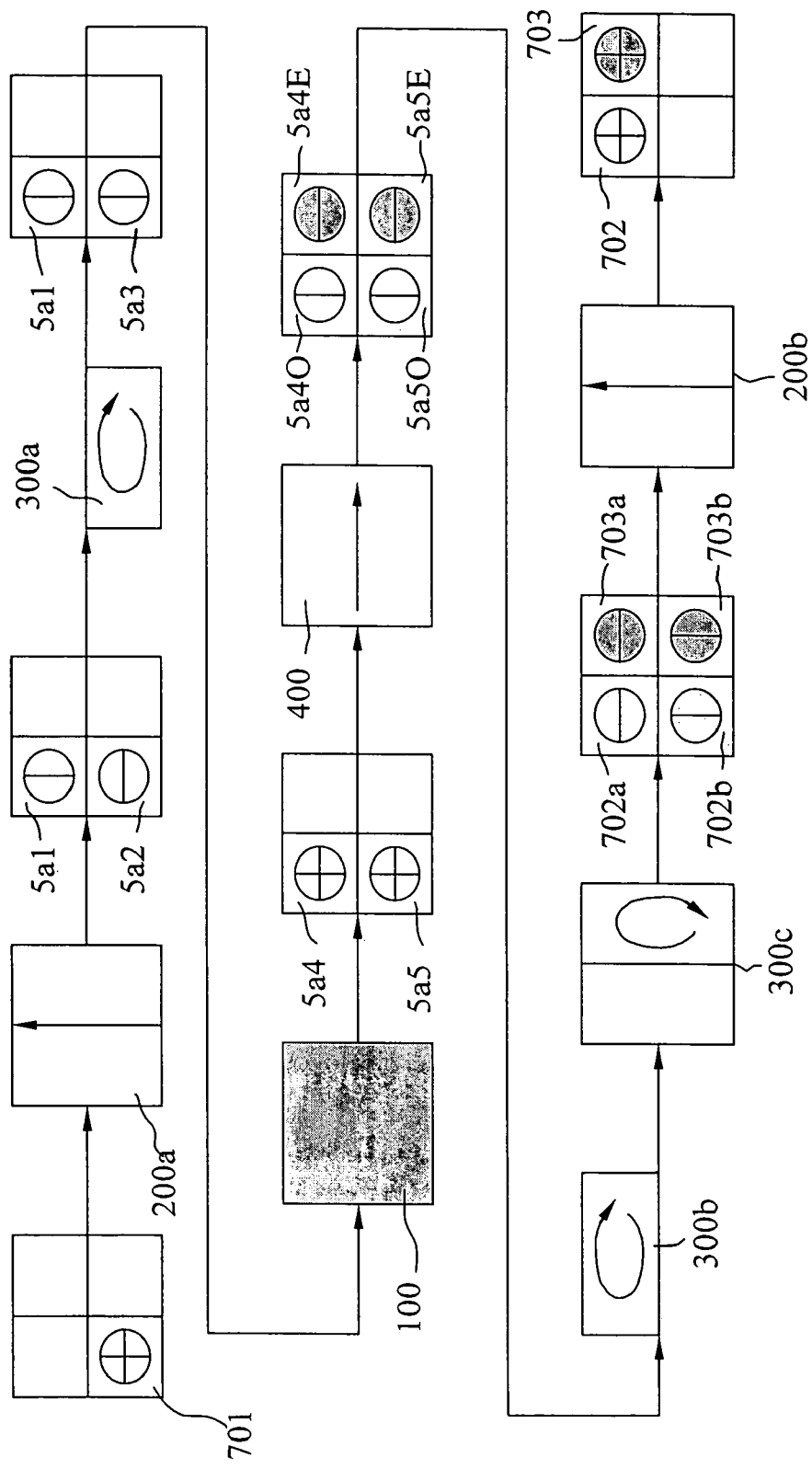
FIG. 5–6 are schematic views illustrating the polarization states of FIG. 4.

FIG. 5 is a schematic view illustrating the polarization states of FIG. 4 according to the third embodiment of the invention. Incidental light 701 travels through a first polarization beam splitter/combiner 200a and splits into two light signals 5a1, 5a2 polarized orthogonal to each other, the light signal 5a1 being in the direction Y due to a walk-off effect. The light signal 5a2 transmitting through the lower part of the first polarization rotating crystal 300a is turned into a light signal 5a3 having a polarization state similar to that of the light signal 5a1. The light signals 5a1, 5a3 then travel through the optical wavelength alternating divider device 100. In the optical wavelength alternating divider device 100, the phase retardation between the different wavelengths generates a cyclic harmonic that includes odd wavelength components ($\lambda_1$, $\lambda_3$, etc.) and even wavelength components ($\lambda_2$, $\lambda_4$, etc.) polarized orthogonal to one another. While traveling through the polarization beam displacer 400, the even wavelength components of the two light signals 5a4, 5a5 are separated, i.e. the light signal 5a4 is split into odd/even light signals 5a4O, 5a4E, and the light signals 5a5 are split into odd/even light signals 5a5O, 5a5E. The deflecting edge 500 modifies the transmission direction of the light signals 5a4O, 5a4E, 5a5O, 5a5E. The second polarization rotating crystal 300b rotates 90° the polarization direction of the light signals 5a4O, 5a4E while the third polarization rotating crystal 300c rotates 90° the polarization direction of the light signals 5a4E, 5aSE. The second polarization beam splitter/combiner 200b respectively combines the light signals 702a, 702b into an odd wavelength signal 702, and the light signals 703a, 703b into an even wavelength signal 703. The odd, even wavelength signals 702, 703 are subsequently coupled to input into two light ports of a dual-optical-fiber collimator.

Figure 6:
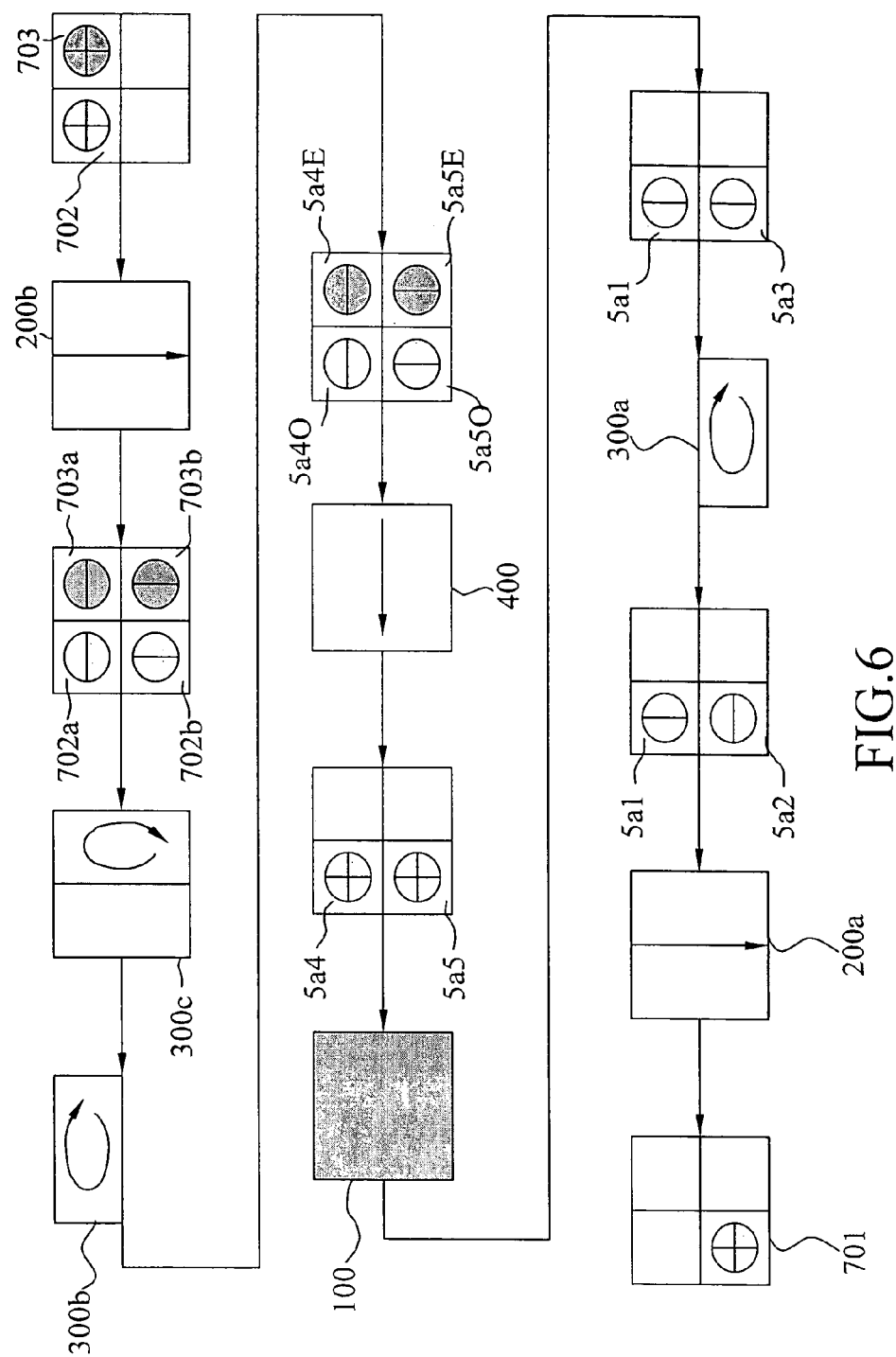

FIG. 6 is a schematic view of a reverse operation of the alternating optical splitter according to the third embodiment of the invention. The odd ray 702 and even ray 703 can be combined into an incidental light 701 including a plurality of wavelengths.

Figure 7:
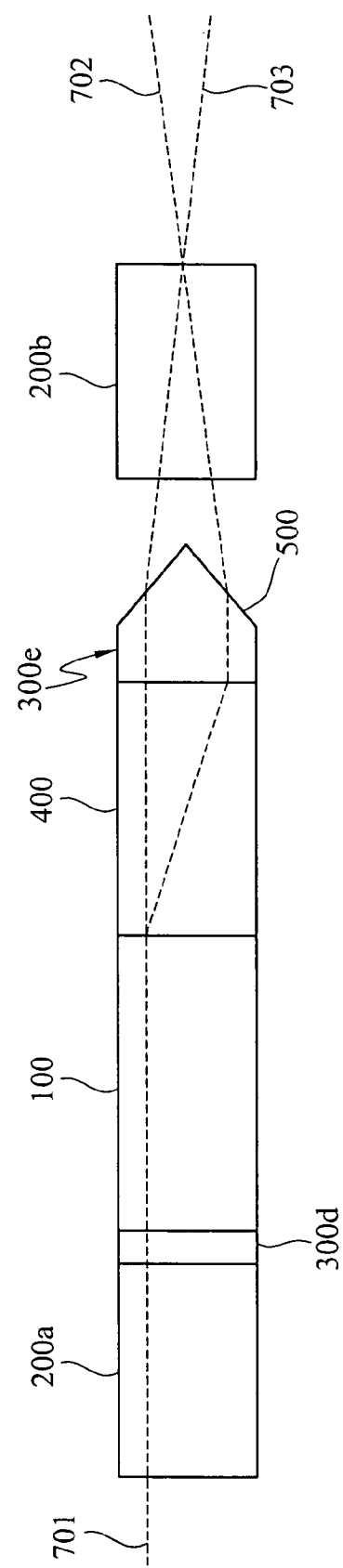
FIG. 7 is a schematic view of a polarization beam combiner according to a fourth embodiment of the invention.

FIG. 7 is a schematic view of a fourth embodiment according to the invention, having a three-ports double-optical circulators characteristic. This embodiment includes a first polarization beam splitter/combiner 200a, a first set of polarization rotating crystals 300d, an optical wavelength alternating divider device 100, a polarization beam displacer 400, a second set of polarization rotating crystals 300e and a second polarization beam splitter/combiner 200b. A side of the second set of polarization rotating crystals 300e adjacent to the second polarization beam splitter/combiner 200b forms a deflecting edge 500 having two slant deflecting faces. Light transmitting through the upper and lower parts of the second set of polarization rotating crystals 300e thereby is respectively deflected at different angles via the deflecting edge 500.

Figure 8:
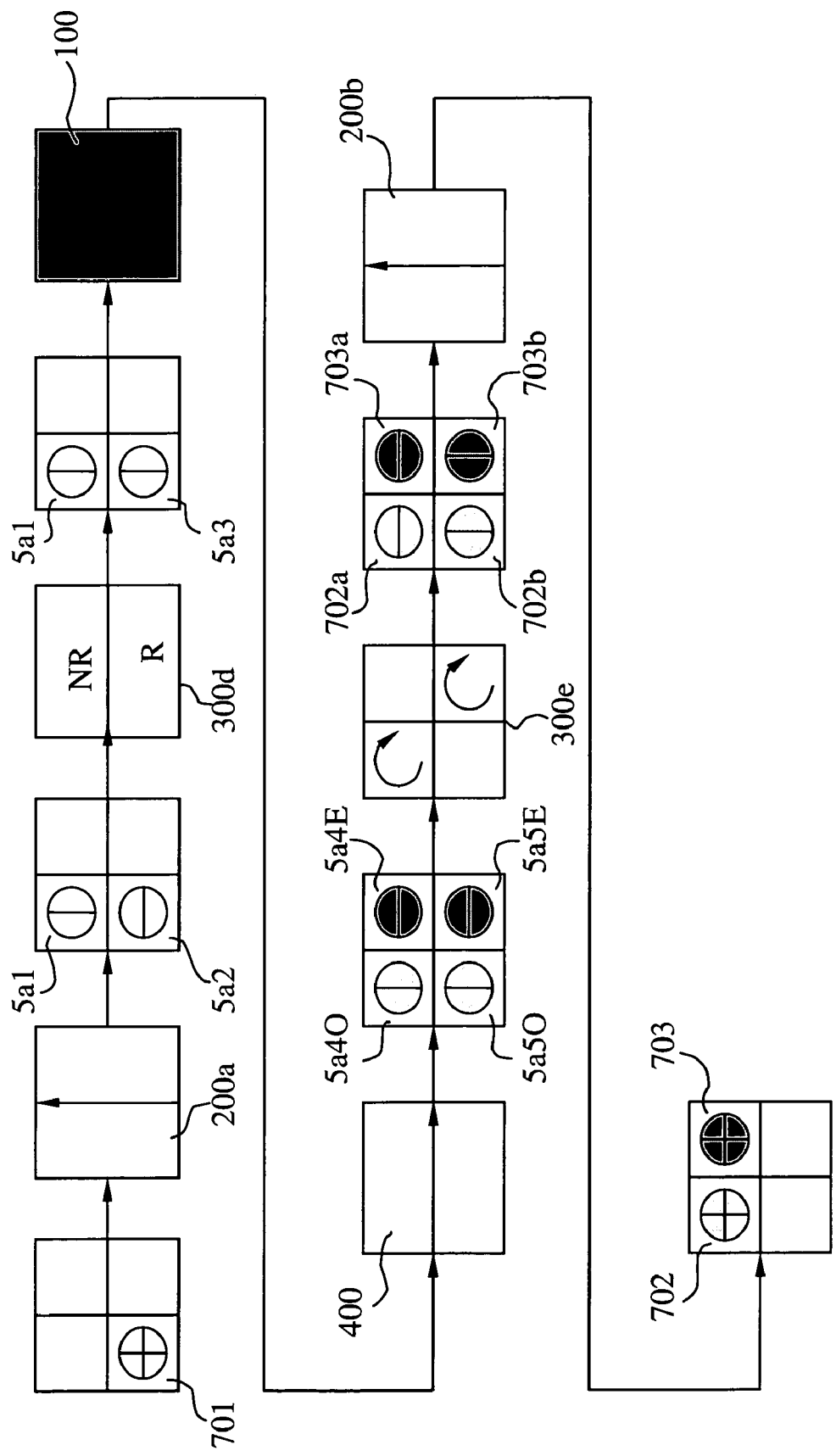
FIG. 8–9 are schematic views illustrating the polarization states implemented in FIG. 7 according to an embodiment of the invention.

FIG. 8 is a schematic view of a polarization state implemented in the fourth embodiment according to the invention. The incidental light 701 of the single-optical-fiber collimator includes a plurality of wavelengths ($\lambda_1$, $\lambda_2$, $\lambda_3$, $\lambda_4$, etc.). The first polarization beam splitter/combiner 200a turns the incidental light 701 into two light signals 5a1, 5a2 orthogonally polarized, the light signal 5a1 being in the direction Y. The first set of polarization rotating crystals 300d turns the light signal 5a2 to a light signal 5a3 with a polarization state similar to that of the light signal 5a1. The notation "R" in the first set of polarization rotating crystals 300d indicates a location where the polarization is rotated 90° while the notation "NR" indicates a location without rotation effect. In a reverse direction of light transmission, the original location "R" becomes "NR" while the original location "NR" becomes "R". A half-wave plate or quarter-wave film can be used in combination with a Faraday rotator to achieve the characteristics of the first set of polarization rotating crystals 300d as described above.

Subsequently, the light signals travel through the optical wavelength alternating divider device 100 and the polarization beam displacer 400 to form light signals 5a4O, 5a4E, 5a5O, 5a5E. After transmission through the second set of polarization rotating crystals 300e are formed the light signals 702a, 702b, 703a, 703b. Lastly, the second polarization beam splitter/combiner 200b respectively combines the light signals 702a, 702b into an odd wavelength signal 702, and the light signals 703a, 703b into an even wavelength signal 703. The odd and even wavelength signals 702, 703 then are coupled and are inputted into two ports of a dual-optical-fiber collimator.

Figure 9:
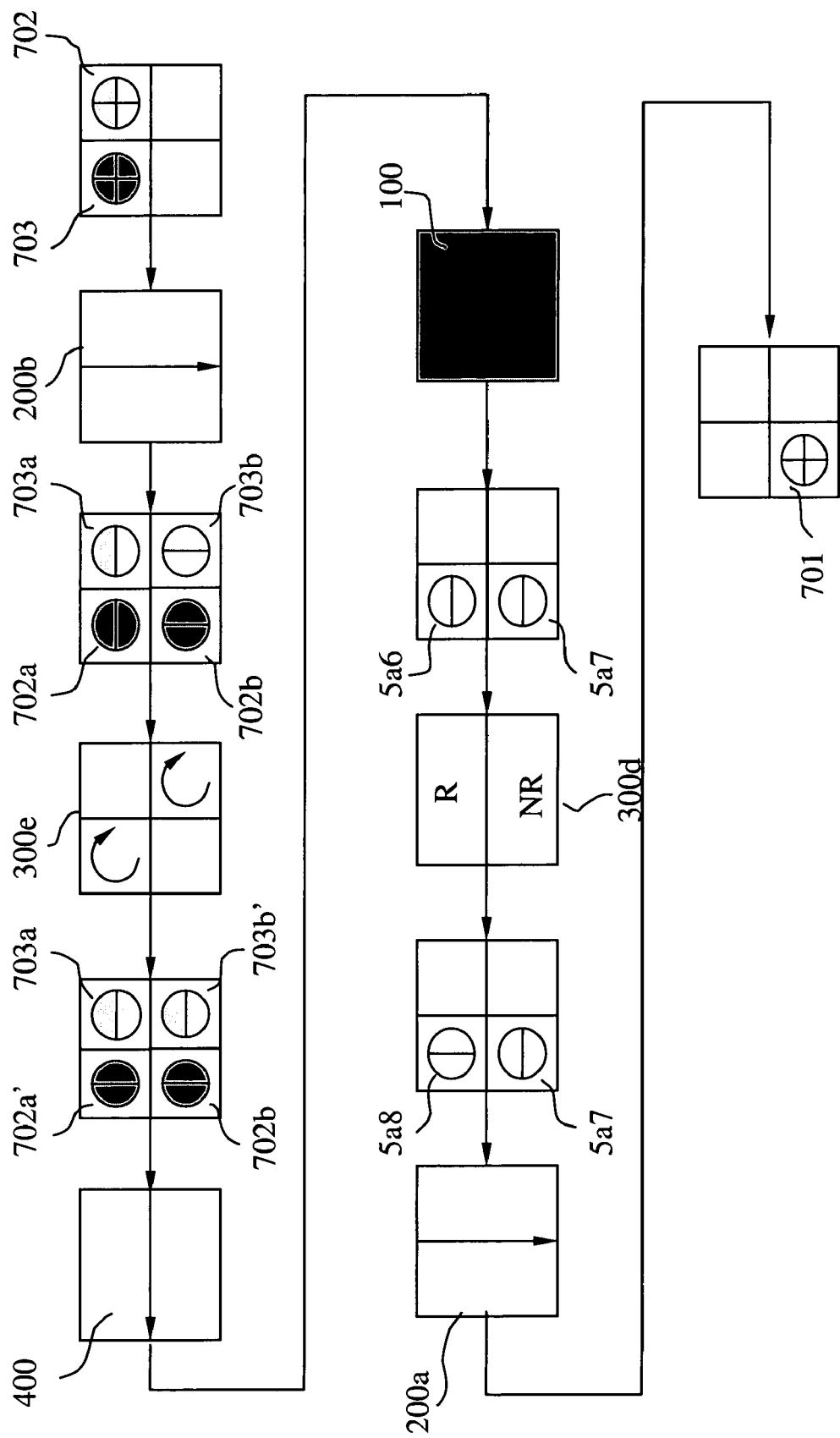

FIG. 9 depicts the polarization state of the fourth embodiment in an optical wavelength alternating combiner configuration according to the invention. Unlike the illustration of FIG. 8, the positions of the odd wavelength signal 702 and even wavelength signal 703 are interchanged, so that the light signals emerging from the optical wavelength alternating divider device 100, in response to the incidence of the odd and even wavelength signals, can be polarized orthogonal. This is illustrated by the difference between the locations of the light signals 5a4O, 5a4E, 5a5O, 5a5E after the polarization beam displacer 400 in FIG. 8 and the locations of the light signals 702a', 702b, 703a, 703b' before the polarization beam displacer 400. Therefore, the light signals 5a6, 5a7 after the optical wavelength alternating divider device 100 and the light signals 5a1, 5a3 before the optical wavelength alternating divider device 100 are polarized orthogonal to obtain an incidental light signal 701 including all the wavelengths.

Figure 10:
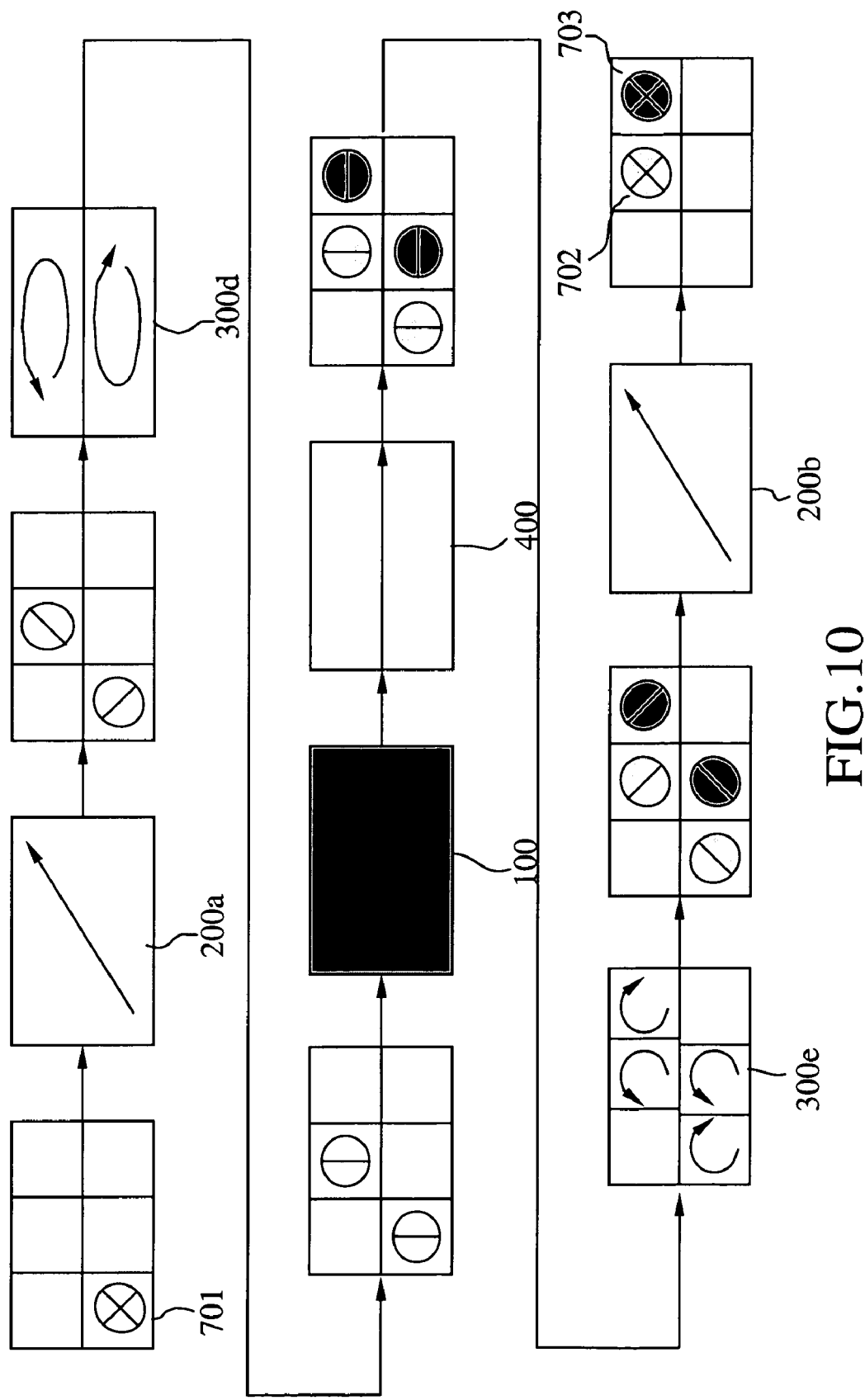
FIG. 10–11 are schematic views illustrating the polarization states implemented in FIG. 7 according to another embodiment of the invention.
Figure 11:
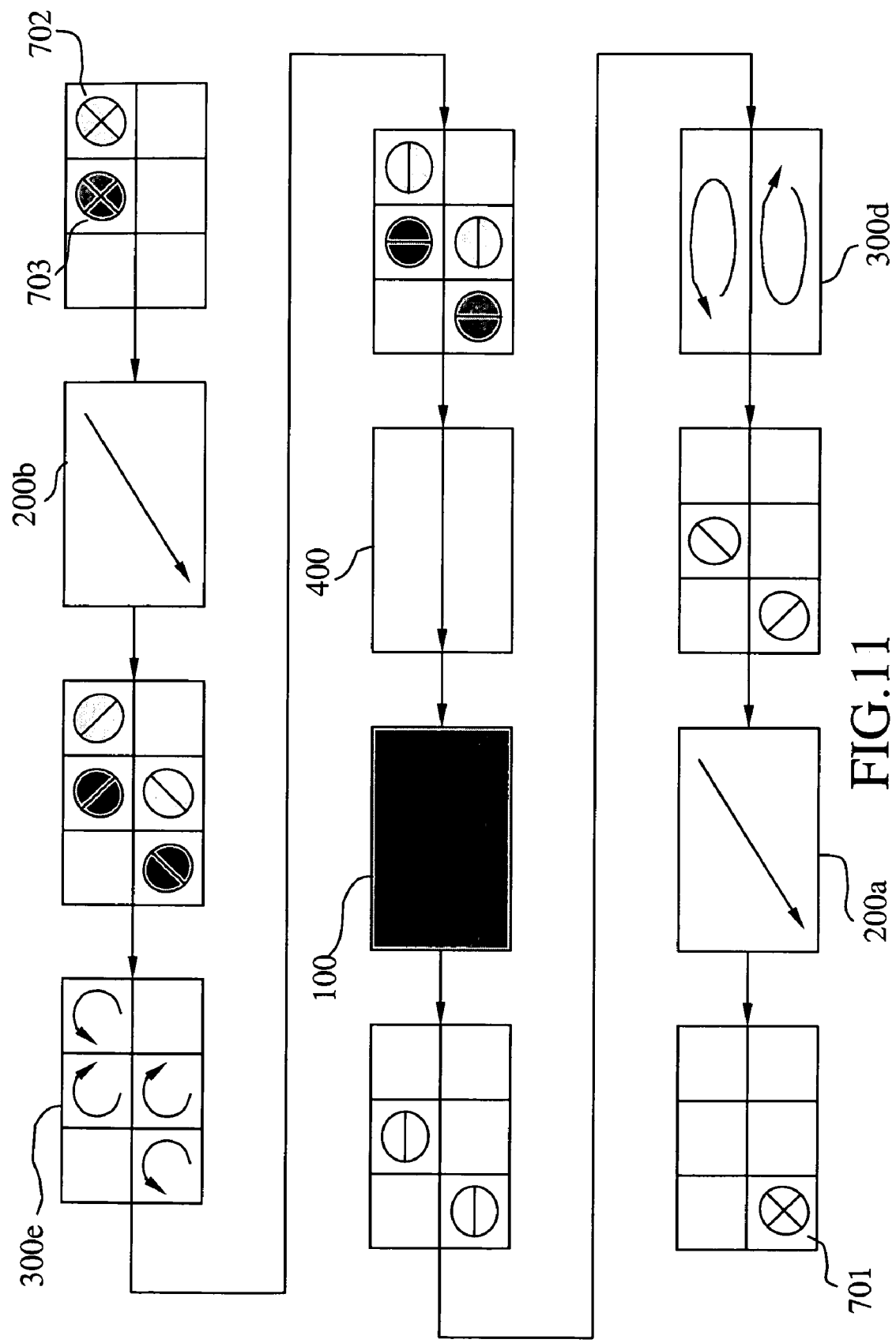
Figure 12A:
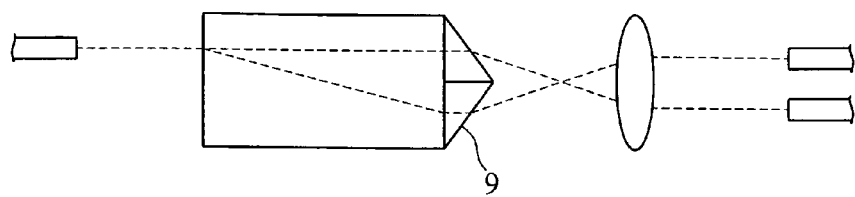
FIG. 12A–12D are schematic views of light polarizing devices provided with wedged crystal according to the prior art.
Figure 12B:
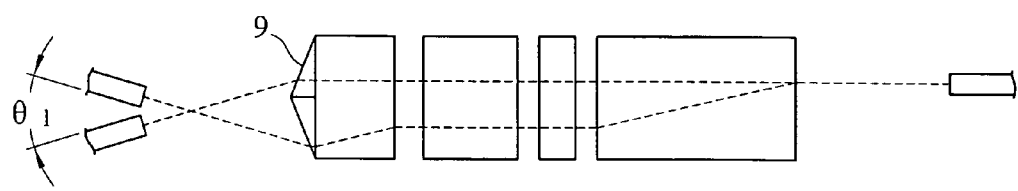
Figure 12C:
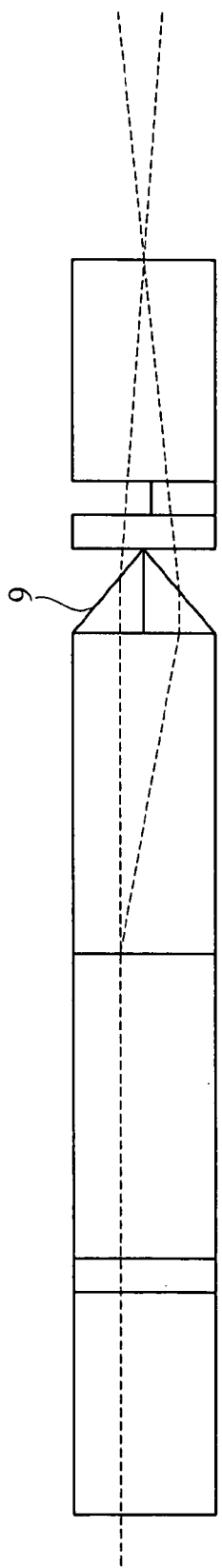
Figure 12D:
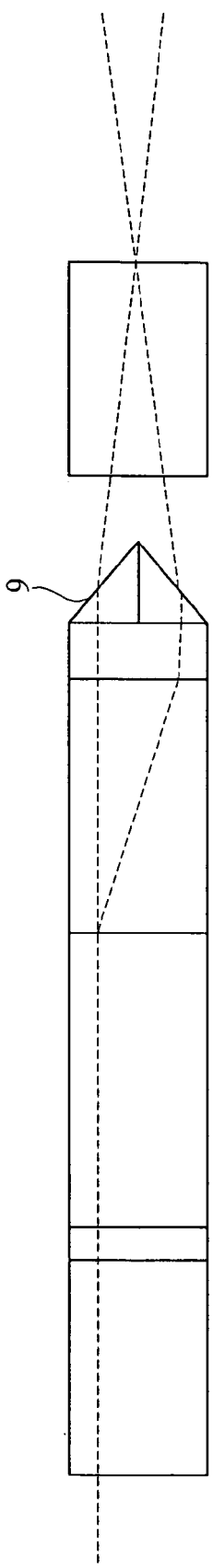

FIG. 10 and FIG. 11 illustrate a variant implementation of the fourth embodiment. A Faraday rotator with irreversible polarization rotation characteristic is used as the first set of polarization rotating crystals 300d, and a half-wave plate is used as the second set of polarization rotating crystals 300e. As a result, this variant implementation of the fourth embodiment is not provided with irreversible optical characteristics. The deviation angle of the first and second polarization beam splitter/combiner 200a, 200b is 45°. The deviation angle of the first and second sets of polarization rotating crystals 300d, 300e can be modified accordingly. Other aspects are similar to the fourth embodiment. Although the incidental light 701 is apparently illustrated with different orientation angles in the different figures, it is understood that the incidental light 701 generally can have any polarization orientation and, in particular, can be randomly polarized.

It will be apparent to the person skilled in the art that the invention as described above may be varied in many ways, and notwithstanding remaining within the spirit and scope of the invention as defined in the following claims.

What is claimed is:

1. An optical polarization beam combiner, installed between a first light port, a second light port and a third light port, wherein the second and third light ports are placed at a same side, the optical polarization combiner comprising:

a single birefringent wedge crystal placed at a side of the second and third light ports, wherein the single birefringent wedge crystal includes a deflecting edge having two deflecting faces adjacent to the second and third light ports, thereby two light signals of orthogonal polarization from the second and third light ports pass through the deflecting edge into the single birefringent wedge crystal, and at least one of the two light signals is deflected at an angle;

a Faraday rotator receiving the two light signals of orthogonal polarization from the single birefringent wedge crystal, wherein the Faraday rotator rotates an angle the two light signals;

a half-wave plate receiving the two light signals from the Faraday rotator, wherein the half-wave plate rotates the light signals an angle opposite to the rotation angle of the Faraday rotator; and a birefringent crystal placed at a side of the first light port, wherein the birefringent crystal receives the two light signals of orthogonal polarization from the half-wave plate and combines the two light signals into a coupled light signal inputted into the first light port;

wherein a first light signal outputted from the first light port travels through the birefringent crystal and is divided into second and third light signals of orthogonal polarization, the half-wave plate rotates an angle the respective polarization states of the second and third light signals, and the Faraday rotator having an optical irreversible characteristic further rotates the same angle the second and third light signals of orthogonal polarization, whereby the polarization directions of the second and third light signals are tilted and differ from the polarization directions of the second and third light ports and thereby are not able to input into the second and third light ports.

2. The optical polarization beam combiner of claim 1, wherein the two light signals traveling through upper and lower parts of the deflecting birefringent wedge crystal are deflected at different angles via the deflecting edge.

3. The optical polarization beam combiner of claim 1, wherein the rotation angle is 45°.

4. The optical polarization beam combiner of claim 3, wherein the optical axis of the half-wave plate and the polarization direction of a light signal incidental thereto form 22.50°.

* * * * *